(12) United States Patent
Li et al.

(10) Patent No.: US 11,016,010 B1
(45) Date of Patent: May 25, 2021

(54) TRIAXIAL ROCK MECHANICS TEST SYSTEM FOR HIGH-STRAIN-RATE CYCLIC DYNAMIC LOADING

(71) Applicant: INSTITUTE OF GEOLOGY AND GEOPHYSICS, CHINESE ACADEMY OF SCIENCES, Beijing (CN)

(72) Inventors: Guanfang Li, Beijing (CN); Xiao Li, Beijing (CN); Shouding Li, Beijing (CN); Jianming He, Beijing (CN); Zhaobin Zhang, Beijing (CN); Tianqiao Mao, Beijing (CN); Bo Zheng, Beijing (CN); Yanfang Wu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/179,444

(22) Filed: Feb. 19, 2021

(30) Foreign Application Priority Data

Nov. 24, 2020 (CN) .......................... 202011327304.0

(51) Int. Cl.
*G01N 3/12* (2006.01)
(52) U.S. Cl.
CPC ....... *G01N 3/12* (2013.01); *G01N 2203/0005* (2013.01); *G01N 2203/0048* (2013.01); *G01N 2203/0256* (2013.01)

(58) Field of Classification Search
CPC .......... G01N 27/22; G01N 27/12; G01N 3/32; G01N 3/10; G01N 3/02
See application file for complete search history.

(56) References Cited

U.S. PATENT DOCUMENTS

| | | | | |
|---|---|---|---|---|
| 10,801,934 | B2 * | 10/2020 | Liu ......................... | G01N 3/18 |
| 2018/0335494 | A1 * | 11/2018 | Hakimuddin ........ | G01N 24/081 |
| 2019/0331569 | A1 * | 10/2019 | Liu ........................ | G01N 3/062 |

* cited by examiner

*Primary Examiner* — Brandi N Hopkins
(74) *Attorney, Agent, or Firm* — Bayramoglu Law Offices LLC

(57) ABSTRACT

A triaxial rock mechanics test system for high-strain-rate cyclic dynamic loading is provided, including: a host loading module, a dynamic cyclic loading module, and a dynamic measurement module. The host loading module includes a loading frame, a triaxial pressure mechanism and an actuator that are provided inside the loading frame. The dynamic cyclic loading module includes a driving mechanism, a fixed mechanism and a mobile mechanism. The dynamic measurement module is configured to acquire axial pressure data, radial deformation data and axial deformation data of the rock sample during a test. In the triaxial rock mechanics test system for high-strain-rate cyclic dynamic loading of the present invention, an energetic rod is driven by an electrical explosion of a metal wire to generate a strong shock wave with controllable peak pressure, duration and waveform.

10 Claims, 5 Drawing Sheets

TRIAXIAL ROCK MECHANICS TEST SYSTEM FOR HIGH-STRAIN-RATE CYCLIC DYNAMIC LOADING

CROSS REFERENCE TO THE RELATED APPLICATIONS

This application is based upon and claims priority to Chinese Patent Application No. 202011327304.0, filed on Nov. 24, 2020, the entire contents of which are incorporated herein by reference.

TECHNICAL FIELD

The present invention belongs to the technical field of rock mechanics test devices, in particular to a triaxial rock mechanics test system for high-strain-rate cyclic dynamic loading.

BACKGROUND

Explosions and shock waves are common forms of dynamic loads in geological engineering. These dynamic loads have kilohertz-level frequencies in the near zone of the rock mass and frequencies of tens to hundreds of hertz in the central and far zones of the rock mass, and the strain rate in the rock mass is in the range of $10^{-2}$-$10^4$/s. At present, the rock mechanics test devices for high-strain-rate dynamic loading include gas-liquid linkage rock mechanics testing machine, Hopkinson pressure bar and light-gas gun, etcetera. These test devices have two major problems. First, they rely on gas-liquid linkage or high-frequency response hydraulic transmission devices to achieve dynamic loading. The effective strain rate is in a limited range and it is hard to achieve dynamic loading at the strain rate of $10^1$-$10^4$/s. Secondly, these test devices rely on pneumatic or electromagnetic means to achieve high-strain-rate dynamic loading, but cannot achieve controlled cyclic dynamic loading. Due to the two problems, the existing dynamic loading rock mechanics test devices cannot perform high-strain-rate cyclic dynamic loading.

SUMMARY

In order to solve the above-mentioned problem that the dynamic loading rock mechanics test device in the prior art cannot perform high-strain-rate cyclic dynamic loading, the present invention provides a triaxial rock mechanics test system for high-strain-rate cyclic dynamic loading. The triaxial rock mechanics test system includes a host loading module, a dynamic cyclic loading module and a dynamic measurement module.

The host loading module includes a loading frame and a triaxial pressure mechanism and an actuator that are provided inside the loading frame; the actuator is provided under the triaxial pressure mechanism; the triaxial pressure mechanism is used to apply an axial pressure and a confining pressure to a rock sample placed therein; the loading frame is able to cooperate with the actuator to form a reaction force frame to apply an axial pressure to the triaxial pressure mechanism.

The dynamic cyclic loading module includes a driving mechanism, a fixed mechanism and a mobile mechanism; the driving mechanism and the fixed mechanism are fixedly provided under the actuator; and the mobile mechanism is movably provided under the actuator. A plurality of shock wave excitation devices are arranged in sequence inside the mobile mechanism; and an energetic rod is provided inside the shock wave excitation device. The mobile mechanism is able to reciprocate relative to the fixed mechanism under the drive of the driving mechanism.

In a working state, the driving mechanism drives the mobile mechanism to reciprocate relative to the fixed mechanism, so that a first action portion of each of the shock wave excitation devices sequentially contacts with a second action portion of the fixed mechanism to excite the energetic rod to generate a controllable shock wave; the controllable shock wave applies a force to the actuator to make the actuator move in a vertical direction and perform high-strain-rate compression on the rock sample, thereby realizing high-strain-rate cyclic dynamic loading of the rock sample.

The dynamic measurement module is used to acquire axial pressure data, radial deformation data and axial deformation data of the rock sample during a test.

In some preferred technical solutions, an oil cylinder is sleeved outside the actuator. The oil cylinder is used to drive the actuator to move upwards in the vertical direction before the dynamic cyclic loading module works, so as to drive a piston of the triaxial pressure mechanism in a close fit with the loading frame to provide a pre-tightening force for the triaxial pressure mechanism.

In some preferred technical solutions, the loading frame includes a door-shaped frame. An upper beam of the loading frame is provided with an upper load pressure sensor coaxial with the triaxial pressure mechanism at a position close to the triaxial pressure mechanism.

In some preferred technical solutions, the host loading module includes a hydraulic oil source and a servo controller. The hydraulic oil source is connected to the triaxial pressure mechanism; and the servo controller is communicatively connected with to hydraulic oil source. The hydraulic oil source is used to store hydraulic oil. The servo controller is able to feed the hydraulic oil into the triaxial pressure mechanism by controlling the hydraulic oil source, so as to provide a confining pressure for the rock sample. Furthermore, the servo controller can pressurize the triaxial pressure mechanism to make the hydraulic oil return to the hydraulic oil source after the test.

In some preferred technical solutions, the triaxial pressure mechanism includes a piston. The piston has an extension end that extends outside the triaxial pressure mechanism. A pressure pad and a pressure head are further provided inside the triaxial pressure mechanism. The piston, the pressure head and the pressure pad are sequentially arranged in a vertical direction directly above the rock sample. An end surface of the pressure head away from the pressure pad is a spherical convex surface.

In some preferred technical solutions, the host loading module further includes a sliding block and a sliding rail that match each other. The sliding rail is provided above the actuator; the sliding block is used to carry the triaxial pressure mechanism; and the sliding block is able to drive the triaxial pressure mechanism to move, along an extension direction of the sliding rail, to a position directly above the actuator.

In some preferred technical solutions, the driving mechanism includes a drive motor and a first gear. The first gear is connected to the output shaft of the drive motor, and is able to rotate around its own axis under the drive of the drive motor.

The mobile mechanism includes a bearing structure. The bearing structure is used to bear the plurality of shock wave excitation devices arranged in sequence. The bearing structure is provided with a meshing portion that meshes with the first gear. The shock wave excitation device has a first action portion extending outside the bearing structure.

A first action groove and a second action groove are provided inside the fixed mechanism. The first action groove is vertically provided in the center of the fixed mechanism; and the second action groove is provided below the first action groove and matches a shape of the mobile mechanism. The first action groove and the second action groove penetrate each other. The actuator is vertically movably provided in the first action groove; the mobile mechanism is movably provided in the second action groove; and an inner wall of the second action groove is provided with a brush. In a working state, the driving mechanism drives the first gear to rotate around the axis thereof, thereby driving the bearing structure to move relative to the fixed mechanism, so that each first action portion is in sliding contact with the brush in sequence.

In some preferred technical solutions, the bearing structure is an arc-shaped structure, and the second action groove is an arc-shaped action groove. The brush is provided in close contact with the inner wall of the second action groove; and the bearing structure and the second action groove are arranged concentrically. The driving mechanism is able to drive the bearing structure to rotate around the circle center thereof, so that the first action portion of each of the shock wave excitation devices is in sliding contact with the arc-shaped brush in sequence.

In some preferred technical solutions, the shock wave excitation device includes a housing. A high-voltage direct current (DC) power supply, an energy storage device, a controller, an energy converter and an energetic rod are arranged inside the housing. The high-voltage DC power supply, the energy storage device, the controller and the energy converter are sequentially connected by a communication link. The energy storage device is used to store energy supplied by the high-voltage DC power supply; the controller performs power amplification by controlling electric pulse compression inside the energy storage device, so that the energy converter generates a high-voltage electric pulse to drive a metal wire in the energetic rod to electrically explode, thus, an energetic material in the energetic rod is excited to release energy to generate a shock wave with controllable peak pressure, controllable waveform and controllable duration.

In some preferred technical solutions, the energetic rod includes a metal wire. The metal wire is covered with an energetic material layer. The shock wave excitation device is used to drive the metal wire to electrically explode, so that a chemical bond of an energetic material in the energetic material layer breaks and chemical energy is released to generate a controllable shock wave.

In some preferred technical solutions, the dynamic measurement module is provided inside the triaxial pressure mechanism and includes a laser deformation sensor, an interferometric fiber optic displacement sensor and a piezoresistive pressure sensor.

The present invention has the following advantages:

In the triaxial rock mechanics test system for high-strain-rate cyclic dynamic loading of the present invention, an energetic rod is driven by an electrical explosion of a metal wire to generate a strong shock wave with controllable peak pressure, duration and waveform. By combining a high-rigidity reaction force loading frame and a high-rigidity actuator, a high-strain-rate cyclic dynamic loading is realized through multiple shock wave excitations. A constant confining pressure is controlled through a triaxial self-balancing pressure chamber and a high-frequency response servo controller. Additionally, through a laser measurement technology, the present invention realizes non-contact precision strain measurement, interferometric fiber optic displacement measurement, and dynamic loading pressure data acquisition by a high-frequency dynamic piezoresistive pressure sensor, thereby realizing high-speed and high-resolution physical quantity measurement during a test.

The present invention realizes high-strain-rate cyclic dynamic loading through a rock mechanics test device, which satisfies the requirements of dynamic loading at a strain rate of $10^1$-$10^4$/s. The present invention facilitates the design, demonstration and mechanical characteristics research of high-strain-rate tests, and is of great significance for a tester to master the relevant knowledge of rock mechanics under a high-strain-rate cyclic dynamic load.

BRIEF DESCRIPTION OF THE DRAWINGS

Other features, objectives and advantages of the present invention will become more apparent upon reading the detailed description of the non-restrictive embodiments of the present invention made with reference to the accompanying drawings.

LIST OF REFERENCE NUMERALS

Figure 1:
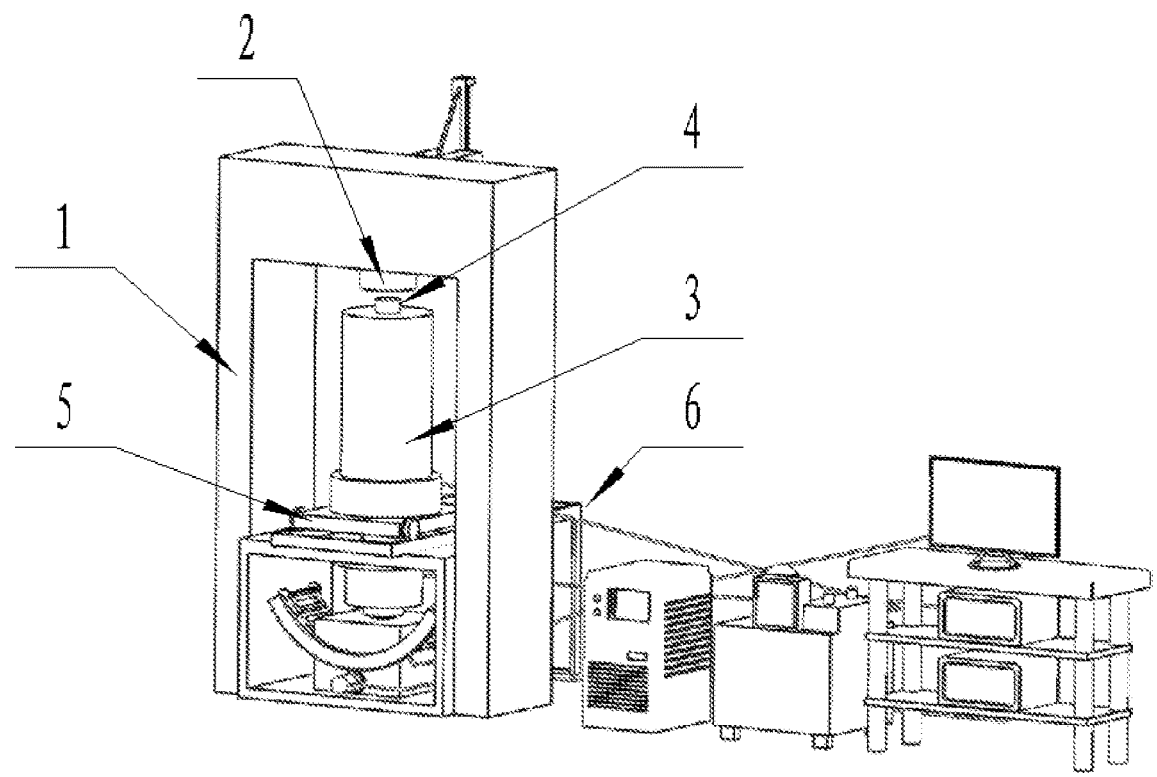
FIG. 1 is an overall structural view of a triaxial rock mechanics test system for high-strain-rate cyclic dynamic loading according to an embodiment of the present invention.
Figure 2:
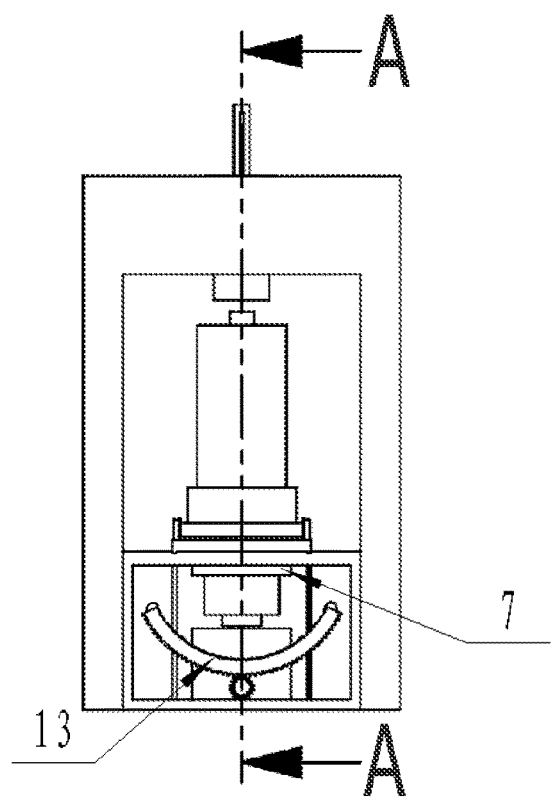
FIG. 2 is a structural view of a host loading module according to an embodiment of the present invention.
Figure 3:
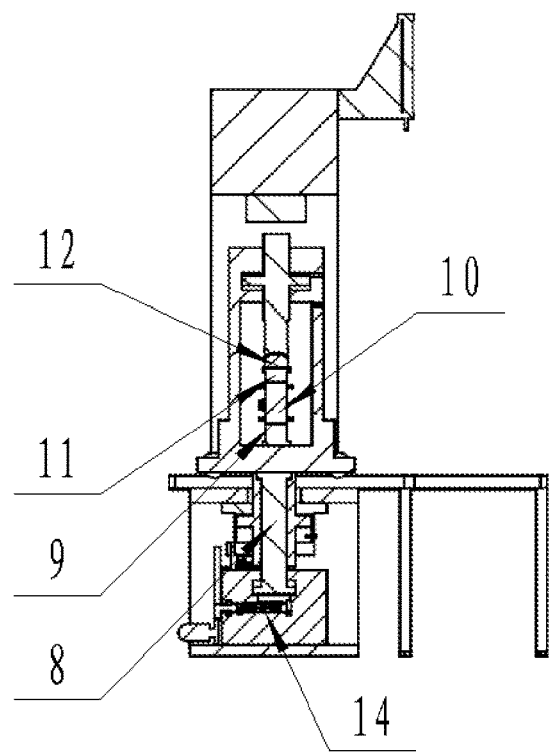
FIG. 3 is a sectional view taken along line A-A in FIG. 2.
Figure 4:
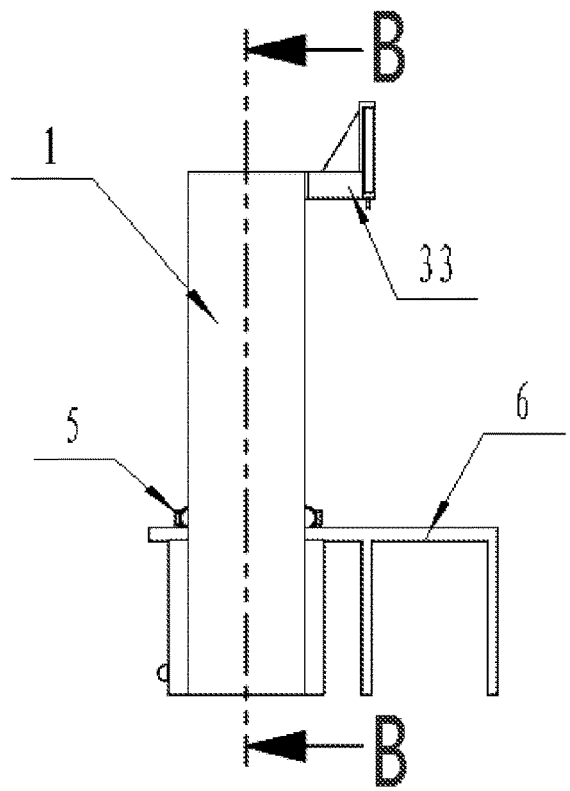
FIG. 4 is a side view of the host loading module according to an embodiment of the present invention.
Figure 5:
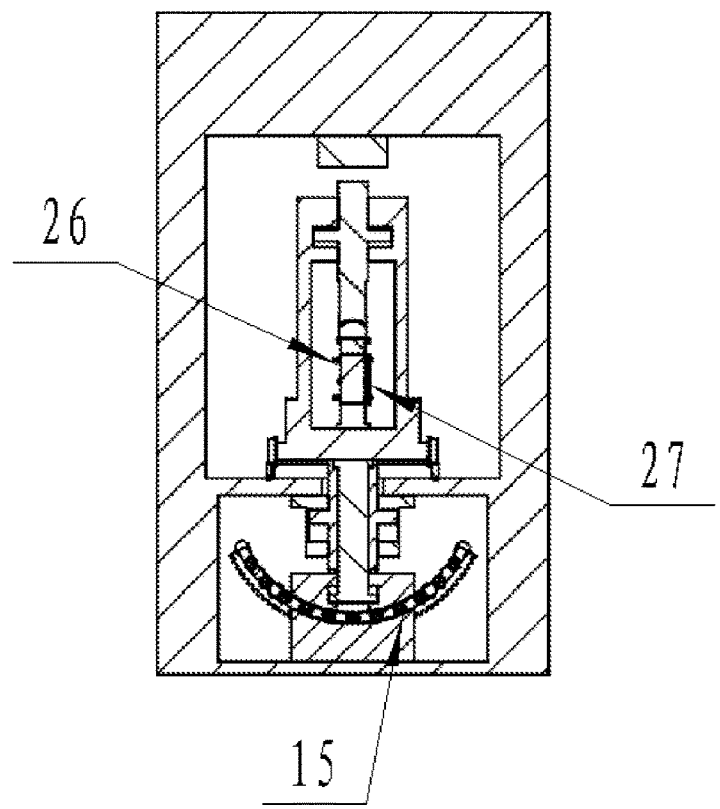
FIG. 5 is a sectional view taken along line B-B in FIG. 3.
Figure 6:
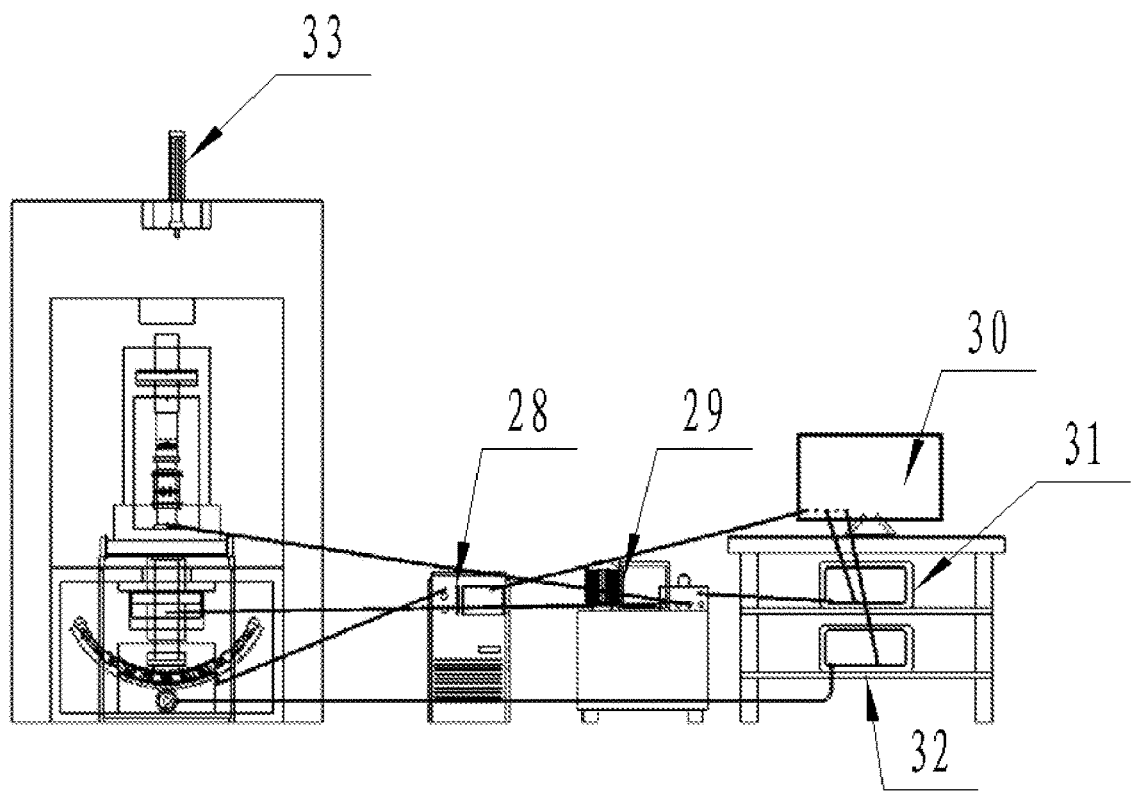
FIG. 6 is a front view of the triaxial rock mechanics test system for high-strain-rate cyclic dynamic loading according to an embodiment of the present invention.
Figure 7:
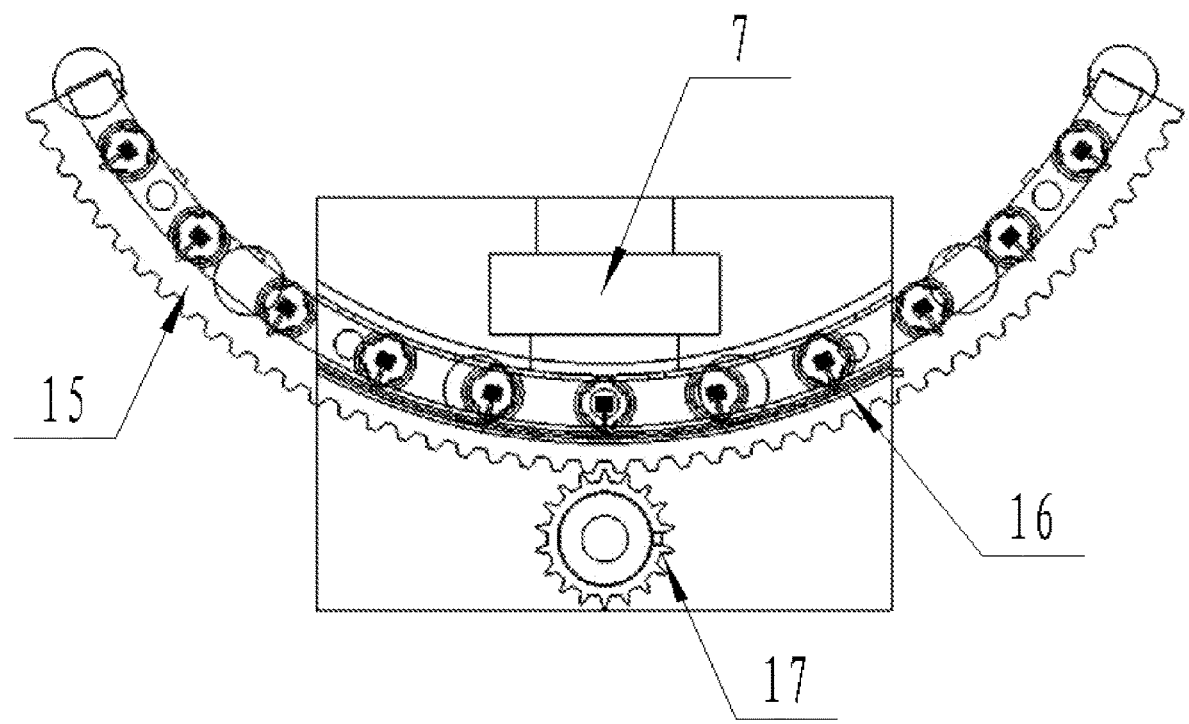
FIG. 7 is a structural view of a dynamic cyclic loading module according to an embodiment of the present invention.
Figure 8:
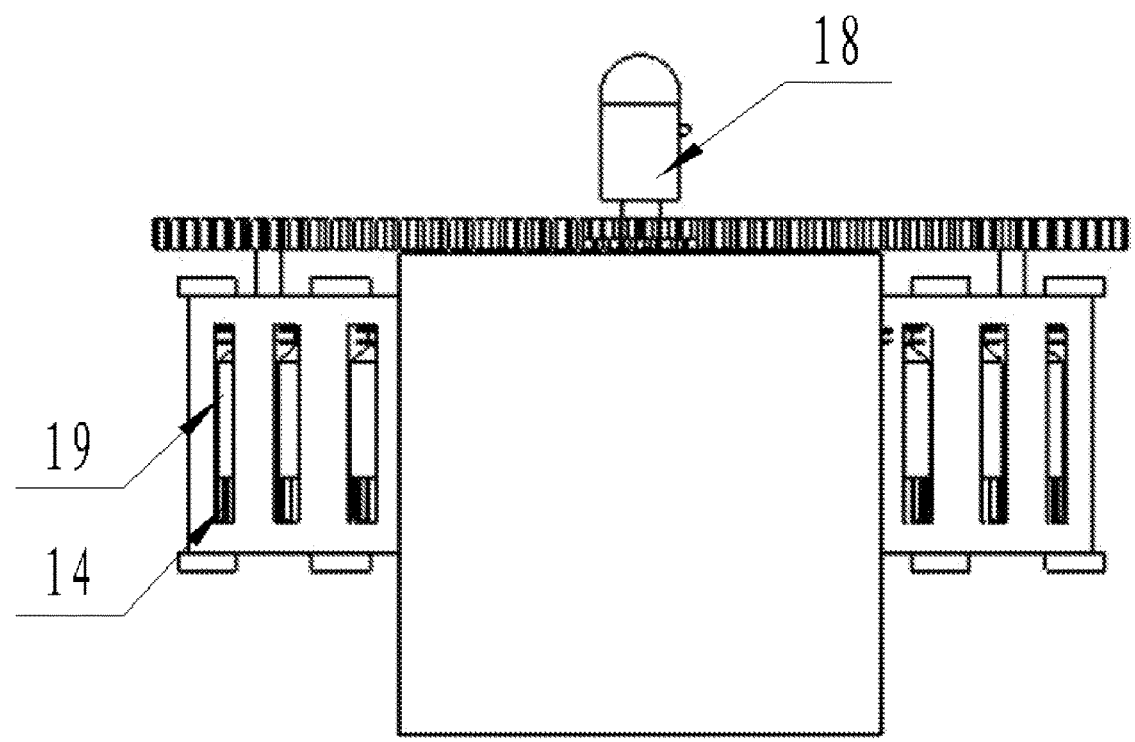
FIG. 8 is a top view of the dynamic cyclic loading module according to an embodiment of the present invention.
Figure 9:
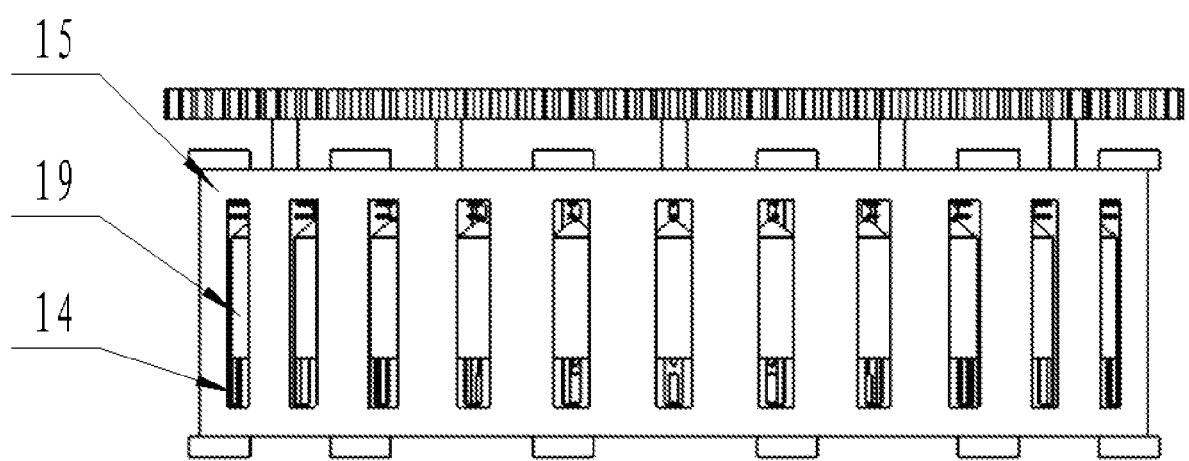
FIG. 9 is a structural view of a bearing structure according to an embodiment of the present invention.
Figure 10:
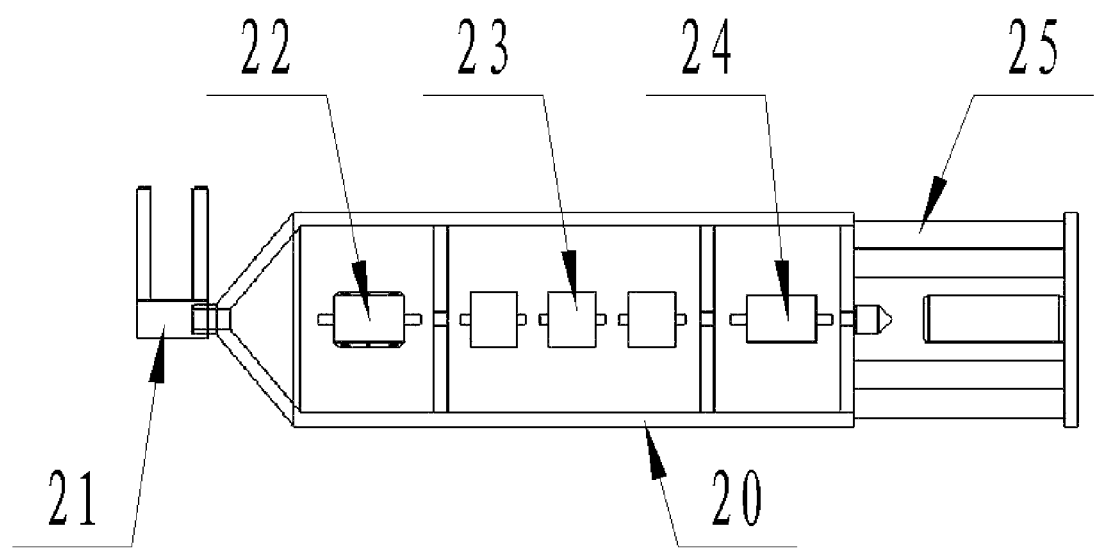
FIG. 10 is a structural view of a shock wave excitation device according to an embodiment of the present invention.

1. loading frame; 2. upper load pressure sensor; 3. triaxial pressure mechanism; 4. piston; 5. pulley; 6. sliding rail; 7. pre-tightening cylinder; 8. actuator; 9. lower load pressure sensor; 10. rock sample; 11. pressure pad; 12. pressure head; 13. dynamic cyclic loading module; 14. energetic rod; 15. energetic rod box; 16. brush; 17. first gear; 18. drive motor; 19. shock wave excitation device; 20. housing of shock wave excitation device; 21. connection terminal; 22. high-voltage direct current (DC) power supply; 23. energy storage device; 24. controller; 25. energy converter; 26. displacement sensor; 27. deformation sensor; 28. energy storage cabinet; 29. hydraulic oil source; 30. computer; 31. servo controller; 32. energy storage cabinet controller; and 33. lifting mechanism.

DETAILED DESCRIPTION OF THE EMBODIMENTS

In order to make the embodiments, technical solutions and advantages of the present invention clearer, the technical solutions of the present invention are clearly and completely described below with reference to the accompanying drawings. Apparently, the described embodiments are a part rather than all of the embodiments. Those skilled in the art should understand that the implementations herein are merely intended to explain the technical principles of the present invention, rather than to limit the protection scope of the present invention.

The present invention provides a triaxial rock mechanics test system for high-strain-rate cyclic dynamic loading. The triaxial rock mechanics test system includes a host loading module, a dynamic cyclic loading module and a dynamic measurement module.

The host loading module includes a loading frame and a triaxial pressure mechanism and an actuator that are provided inside the loading frame. The actuator is provided under the triaxial pressure mechanism. The triaxial pressure mechanism is used to apply an axial pressure and a confining pressure to a rock sample placed therein. The loading frame is able to cooperate with the actuator to apply an axial pressure to the triaxial pressure mechanism.

The dynamic cyclic loading module includes a driving mechanism, a fixed mechanism and a mobile mechanism. The driving mechanism and the fixed mechanism are fixedly provided under the actuator. A plurality of shock wave excitation devices are arranged in sequence inside the mobile mechanism. An energetic rod is provided inside the shock wave excitation device. The mobile mechanism is able to reciprocate relative to the fixed mechanism under the drive of the driving mechanism.

In a working state, the driving mechanism drives the mobile mechanism to reciprocate relative to the fixed mechanism, so that a first action portion of each of the shock wave excitation devices sequentially contacts with a second action portion of the fixed mechanism to excite the energetic rod to generate a controllable shock wave. The controllable shock wave applies a force to the actuator to make the actuator move in a vertical direction and perform high-strain-rate compression on the rock sample, thereby realizing high-strain-rate cyclic dynamic loading of the rock sample.

The dynamic measurement module is used to acquire axial pressure data, radial deformation data and axial deformation data of the rock sample during a test.

In order to more clearly describe the triaxial rock mechanics test system for high-strain-rate cyclic dynamic loading according to the present invention, a preferred embodiment of the present invention is described in detail below with reference to the accompanying drawings.

As a preferred embodiment of the present invention, a triaxial rock mechanics test system for high-strain-rate cyclic dynamic loading is as shown in FIG. 1, the triaxial rock mechanics test system includes a host loading module, a dynamic cyclic loading module and a dynamic measurement module.

The host loading module includes the loading frame 1 and the triaxial pressure mechanism 3 and the actuator 8 that are provided inside the loading frame 1. The actuator 8 is provided under the triaxial pressure mechanism 3. The triaxial pressure mechanism 3 is used to apply an axial pressure and a confining pressure to the rock sample 10 placed therein. The actuator 8 is able to reciprocate in a vertical direction to make an upper beam of the loading frame 1 apply an axial pressure to the piston 4 of the triaxial pressure mechanism.

Specifically, the loading frame 1 may be a door-shaped frame or a square-shaped frame. Preferably, the loading frame is a rigid structure and includes an upper beam. The upper beam is provided with the upper load pressure sensor 2 at a position close to the triaxial pressure mechanism 3. The upper load pressure sensor 2 is arranged coaxially with the triaxial pressure mechanism, that is, coaxially with the piston 4. The piston 4 can closely contact with the upper load pressure sensor 2 so that the upper load pressure sensor can measure an axial pressure received by the piston 4. Further, the lifting mechanism 33 is provided on the top of the loading frame 1. The lifting mechanism 33 can drive the triaxial pressure mechanism 3 to move up and down. Before a test begins, the lifting mechanism 33 drives the triaxial pressure mechanism to go down to a workbench. After the test is completed, the lifting mechanism 33 that is connected to the triaxial pressure mechanism 3 lifts the triaxial pressure mechanism 3 upwards to take out the rock sample 10.

It should be noted that the triaxial pressure mechanism 3 of the present invention is a triaxial pressure chamber. For details, those skilled in the art may refer to known techniques. In the present invention, the triaxial pressure mechanism 3 includes the piston 4. The piston 4 has an extension end that extends outside the triaxial pressure mechanism 3. The pressure pad 11 and the pressure head 12 are further provided inside the triaxial pressure mechanism 3. The piston 4, the pressure head 12 and the pressure pad 11 are sequentially arranged in a vertical direction directly above the rock sample 10. An end surface of the pressure head 12 away from the pressure pad 11 is a spherical convex surface. That is, a contact surface between the pressure head and the piston 4 is a spherical convex surface, which is used to adjust a parallelism error of the rock sample 10.

Specifically, in the embodiment of the present invention, the actuator 8 is located below the rock sample 10. The lower load pressure sensor 9 is further provided between the actuator 8 and the rock sample. The pressure pad 11 and the pressure head 12 are arranged above the rock sample. A lower end of the piston 4 is in close fit with the spherical convex surface of the pressure head 12, and an upper end of the piston 4 extends outside the triaxial pressure mechanism 3. The piston 4 can contact with the upper load pressure sensor 2 under the action of the actuator 8. The loading frame 1 can cooperate with the actuator 8 to form a reaction force frame, so that the rigid loading frame exerts an axial pressure on the piston 4 to provide an axial pressure for the rock sample 10.

In some preferred embodiments, the pre-tightening cylinder 7 is sleeved outside the actuator 8. The pre-tightening cylinder 7 is used to drive the actuator 8 to move upwards in the vertical direction before the dynamic cyclic loading module 13 works, thereby driving the piston 4 of the triaxial pressure mechanism to be in close fit with the loading frame 1, so as to provide a pre-tightening force for the triaxial pressure mechanism 3. In the present invention, the actuator 8 is a high-rigidity actuator.

Further, in the present invention, the host loading module includes the hydraulic oil source 29 and the servo controller 31. The hydraulic oil source 29 is connected to the triaxial pressure mechanism 3. The servo controller 31 is communicatively connected to the hydraulic oil source 29. The hydraulic oil source 29 is used to store hydraulic oil. The servo controller 31 is able to feed the hydraulic oil into the triaxial pressure mechanism 3 by controlling the hydraulic oil source 29 to provide a confining pressure for the rock sample 10. Additionally, the servo controller 31 can pressurize the triaxial pressure mechanism 3 to make the hydraulic oil return to the hydraulic oil source after the test. In some embodiments, the host loading module further includes an oil pump and an air compressor. The hydraulic oil source 29 is connected to the triaxial pressure mechanism 3 through the oil pump, and the air compressor is also connected to the triaxial pressure mechanism 3. The hydraulic oil source 29 is used to store hydraulic oil, and the hydraulic oil is fed into the triaxial pressure mechanism 3 through a piston of the oil pump so as to provide a confining pressure. After the test is completed, the air compressor is used to pressurize the triaxial pressure mechanism 3 to make the hydraulic oil return to the hydraulic oil source 29. The specific action time and value of the confining pressure and other parameters are controlled by the computer 30 communicatively connected to the servo controller. Those skilled in the art may implement the control by the existing technology, which will not be repeated here.

In other preferred embodiments of the present invention, the host loading module further includes a sliding block and a sliding rail that match each other. Referring to FIG. 1, the sliding block is designed as the pulley 5, which can move along an extension direction of the sliding rail 6. Specifically, the sliding rail 6 is provided above the actuator 8, and the pulley 5 is used to carry the triaxial pressure mechanism 3. During the test, the rock sample 10 inside the triaxial pressure mechanism 3 is fixed by a tester. Then the triaxial pressure mechanism 3 is driven by the pulley 5 to move along the extension direction of the sliding rail 6 to a position directly above the actuator 8, so that the actuator 8 and the rock sample 10 are arranged coaxially.

Referring to FIGS. 7 to 10, the dynamic cyclic loading module 13 includes a driving mechanism, a fixed mechanism and a mobile mechanism. The driving mechanism and the fixed mechanism are fixedly provided under the actuator 8. A plurality of shock wave excitation devices 19 are arranged in sequence inside the mobile mechanism. The energetic rod 14 is provided inside the shock wave excitation device 19. The mobile mechanism is able to reciprocate relative to the fixed mechanism under the drive of the driving mechanism to realize automatic filling of the energetic rod 14.

In a working state, the driving mechanism drives the mobile mechanism to reciprocate relative to the fixed mechanism, so that a first action portion of each of the shock wave excitation devices 19 sequentially contacts with a second action portion of the fixed mechanism to excite the energetic rod 14 to generate a controllable shock wave. The controllable shock wave applies a force to the actuator 8 to make the actuator move in a vertical direction and perform high-strain-rate compression on the rock sample 10, thereby realizing high-strain-rate cyclic dynamic loading of the rock sample 10. The shock wave is a strong shock wave with controllable peak pressure, duration, and waveform. By combining the high-rigidity reaction force frame and the high-rigidity actuator to carry out multiple shock wave excitations, high-strain-rate cyclic dynamic loading is achieved.

Specifically, the driving mechanism includes the drive motor 18 and the first gear 17. The first gear 17 is connected to the output shaft of the drive motor 18 and is able to rotate around the axis thereof under the drive of the drive motor 18.

The mobile mechanism includes a bearing structure, which is the energetic rod box 15 as shown in the figure. The energetic rod box 15 is used to bear a plurality of shock wave excitation devices 19 arranged in sequence. The energetic rod box 15 has a meshing portion that meshes with the first gear 17. The shock wave excitation device 19 has a first action portion extending outside the energetic rod box 15. In a preferred embodiment of the present invention, the first action portion is the connection terminal 21 shown in FIG. 10.

A first action groove and a second action groove are provided inside the fixed mechanism. The first action groove is vertically provided in the center of the fixed mechanism. The second action groove is provided below the first action groove and matches a shape of the mobile mechanism. The first action groove and the second action groove penetrate each other. The actuator 8 is vertically movably provided in the first action groove. The mobile mechanism is movably provided in the second action groove. An inner wall of the second action groove is provided with the brush 16. In a preferred embodiment of the present invention, the second action portion is the brush 16.

In a working state, the driving mechanism drives the first gear 17 to rotate around the axis thereof, thereby driving the energetic rod box 15 to move relative to the fixed mechanism, so that the connection terminal 21 of each of the shock wave excitation devices 19 is in sliding contact with the brush 16 in sequence.

In a preferred embodiment of the present invention, the bearing structure is an arc-shaped structure, that is, the energetic rod box 15 is an arc-shaped structure. The second action groove is an arc-shaped action groove. The brush 16 is provided in close contact with the inner wall of the second action groove, that is, the brush 16 is provided in an arc shape. The energetic rod box 15 and the second action groove are arranged concentrically.

The shock wave excitation device 19 includes the housing 20. The high-voltage DC power supply 22, a plurality of energy storage devices 23, the controller 24, the energy converter 25 and the energetic rod 14 are arranged inside the housing 20. The high-voltage DC power supply 22, the plurality of energy storage devices 23, the controller 24 and the energy converter 25 are connected through a communication link. The plurality of energy storage devices 23 are connected in series. The high-voltage DC power supply 22 is communicatively connected to the connection terminal 21, and charges the energy storage device 23 through a choke coil. The energy storage device 23 stores the energy supplied by the high-voltage DC power supply 22, and realizes electric pulse compression and power amplification through the rapid switching of the controller 24. The controller 24 is used to transfer the electric energy stored in the energy storage device 23 to the energy converter 25. The energy converter 25 generates a high-voltage electric pulse to excite the energetic rod 14 and drive a metal wire in the energetic rod 14 to electrically explode. In this way, a chemical bond of an energetic material breaks and the chemical energy is released to generate a strong shock wave with controllable peak pressure, duration and waveform.

The energetic rod 14 includes a metal wire. The metal wire is covered with an energetic material layer. The shock wave excitation device 19 is used to drive the metal wire to electrically explode, so that a chemical bond of an energetic material in the energetic material layer breaks and the chemical energy is released to generate a controllable shock wave. Specifically, in a preferred embodiment, the energetic rod 14 includes an outer shell, a metal wire and an inner tube. The outer shell and the inner tube are hollow straight tubes with closed ends. The outer shell is coaxially sleeved outside the inner tube. The metal wire is provided along an axis of the outer shell and the inner tube. Two ends of the metal wire extend out of the outer shell and are fixedly mounted. The inner tube is filled with a powdery energetic material. A liquid energetic material is filled between the inner tube and the outer shell. Preferably, the outer shell includes a straight tube and end caps inserted at both ends of the straight tube. The straight tube is a metal tubular structure. The end caps are made of a non-metallic material. The end caps are provided with a fixed post towards the straight tube in the center thereof. The inner tube is made of glass. Both ends of the inner tube are provided with inner tube ends. The inner tube ends are in contact with the fixed post. The end cap and the inner tube end are provided with through holes along the axis thereof. Preferably, the metal wire has a diameter of 300-500 μm and is made of tungsten or tantalum. The powdery energetic material includes 20-30% by mass of aluminum powder, 65-75% by mass of ammonium perchlorate or potassium perchlorate and 3-5% by mass of paraffin wax, and the powdery energetic material has a packing density of 1.0-1.2 g/cm$^3$. The liquid energetic material includes 95% by mass of nitromethane and 5% by mass of ethylenediamine. Preferably, an outer surface of the straight tube is provided with a plurality of groove sets along an axial direction. Each groove set includes a plurality of rectangular grooves arranged along a periphery of the straight tube.

The present invention utilizes the plasma, shock wave, strong electromagnetic radiation and other effects generated by the electrical explosion of the metal wire to drive the energetic material to release energy. The energetic material has a unique feature, that is, to undergo a chemical reaction in the absence of air and instantly output huge power. The reaction is triggered by a variety of factors, which can be summarized into two mechanisms, namely, heat and shock waves. Heat and shock waves locally heat up inside the energetic material to form a "hot spot" and trigger the chemical reaction, which in turn causes the entire energetic material to rapidly release energy. With the help of the chemical energy of the energetic material, the energy of the shock wave can be increased dozens of times. In the driving process, by optimizing parameters of the metal wire and the energetic material, shock waves with adjustable parameters can be generated safely, controllably and repeatedly to meet the needs of different rock tests. Compared with traditional chemical explosions, the present invention can achieve high-strain-rate dynamic cyclic loading tests.

In the present invention, the dynamic cyclic loading module 13 starts working from one side. The drive motor 18 drives the first gear 17 to move the energetic rod box 15, so as to make each connection terminal 21 contact with the brush 16 in sequence to excite the energetic rod 14 to generate a controllable shock wave. The present invention does not limit the number of the energetic rods 14, and twelve energetic rods 14 are provided in a preferred embodiment. After all the energetic rods 14 in the energetic rod box 15 are excited, new energetic rods 14 are filled by a method which may be set by a tester. Preferably, in the present invention, the bearing structure may also be a linear structure, that is, to adopt a rack and pinion transmission mode. Thus, under the drive of the drive motor 18, the energetic material in each energetic rod sequentially releases energy, thereby generating a shock wave with controllable peak pressure, waveform and duration.

The dynamic measurement module is provided inside the triaxial pressure mechanism 3, and is used to acquire axial pressure data, radial deformation data and axial deformation data of the rock sample 10 during the test. A non-contact precision strain measurement is achieved by a laser measurement technology, including interferometric fiber optic displacement measurement and dynamic loading pressure data acquisition by a high-frequency dynamic piezoresistive pressure sensor, thereby realizing high-speed and high-resolution physical quantity measurement during the test.

Preferably, the dynamic measurement module includes a laser deformation sensor, an interferometric fiber optic displacement sensor and a piezoresistive pressure sensor. In a preferred embodiment of the present invention, the dynamic measurement module includes the displacement sensor 26, the deformation sensor 27, the upper load pressure sensor 2 and the lower load pressure sensor 9 that are arranged on a periphery of the rock sample 10. The present invention does not limit the positions of these sensors, as long as the rock sample 10 can be measured. More preferably, the dynamic measurement module of the present invention may further include an image monitoring device for acquiring a fracture appearance of the rock sample. Each component in the dynamic measurement module transmits a detected data signal to the fully-digital dynamic closed-loop servo controller 31 or the computer 30 through a data wire.

In the present invention, a test process of the triaxial rock mechanics test system for high-strain-rate cyclic dynamic loading includes:

S100: starting a computer, turning on a servo controller and an energy storage cabinet controller, and communicatively connecting the computer to the servo controller and the energy storage cabinet controller;

S200: turning on a high-voltage power supply, and installing energetic rods with a certain packing volume in an energy storage rod box in sequence;

S300: installing the laser deformation sensor 27 and the optical fiber displacement sensor 26 for the rock sample 10, placing on a sample table, and connecting with a data wire;

S400: placing the pressure pad 11 and the pressure head 12 on the rock sample 10; lowering a triaxial pressure chamber, that is, the triaxial pressure mechanism 3, through the lifting mechanism 33; placing the triaxial pressure mechanism 3 on the pulley 5; pushing the triaxial pressure mechanism 3 with the rock sample 10 to the center of the loading frame 1 through the trolley 5;

S500: setting sampling parameters of each sensor for high-speed and high-resolution measurement on the computer;

S600: turning on the hydraulic oil source 29 to fill the pre-tightening cylinder 7 with wear-resistant hydraulic oil; allowing the high-rigidity actuator 8 to move upwards until the piston 4 of the triaxial pressure mechanism is in close fit with the upper load pressure sensor 5;

S700: turning on the hydraulic oil source 29 to fill the triaxial pressure mechanism 3 with the wear-resistant hydraulic oil until reaching a set confining pressure;

S800: starting the dynamic cyclic loading module 13; exciting the energetic rod 14 by the shock wave excitation device 19 to generate a controllable shock wave; moving the high-rigidity actuator 8 upwards to apply a shock load on the rock sample 10; controlling the drive motor 18 to make the connection terminal 21 of each shock wave excitation device 19 contact with the brush 16 sequentially to excite the set energetic rod, so as to carry out high-strain-rate cyclic dynamic loadings in sequence for a triaxial rock mechanics test;

S900: saving dynamic measurement values of each sensor acquired during the test on the computer 30 after the test is completed; unloading the confining pressure; move the piston 4 of the triaxial pressure mechanism downwards to push out the pulley 5; removing the rock sample 10 to complete the test.

The above-mentioned technical solutions in the embodiments of the present invention at least have the following technical effects and advantages.

In the triaxial rock mechanics test system for high-strain-rate cyclic dynamic loading of the present invention, an energetic rod is driven by an electrical explosion of a metal wire to generate a strong shock wave with controllable peak pressure, duration and waveform. By combining a high-rigidity reaction force loading frame and a high-rigidity actuator, a high-strain-rate cyclic dynamic loading is achieved through multiple shock wave excitations. A constant confining pressure is controlled through a triaxial self-balancing pressure chamber and a high-frequency response servo controller. Additionally, through a laser measurement technology, the present invention realizes non-contact precision strain measurement, interferometric fiber optic displacement measurement, and dynamic loading pressure data acquisition by a high-frequency dynamic piezoresistive pressure sensor, thereby realizing high-speed and high-resolution physical quantity measurement during a test.

The present invention realizes high-strain-rate cyclic dynamic loading through a rock mechanics test device, which satisfies the requirements of dynamic loading at a strain rate of $10^1$-$10^4$/s. The present invention facilitates the design, demonstration and mechanical characteristics research of high-strain-rate tests, and is of great significance for a tester to master the relevant knowledge of rock mechanics under a high-strain-rate cyclic dynamic load.

It should be noted that in the description of the present invention, terms such as "central", "upper", "lower", "left", "right", "vertical", "horizontal", "inner" and "outer" indicate orientation or position relationships based on the accompanying drawings. They are merely intended to facilitate description, rather than to indicate or imply that the mentioned device or components must have a specific orientation and must be constructed and operated in a specific orientation. Therefore, these terms should not be construed as a limitation to the present invention. Moreover, the terms "first", "second" and "third" are used only for the purpose of description, rather than to indicate or imply relative importance.

In addition, it should be noted that in the description of the present invention, unless otherwise clearly specified, meanings of terms "install", "connect with" and "connect to" should be understood in a broad sense. For example, the connection may be a fixed connection, a detachable connection, or an integral connection, may be a mechanical connection or an electrical connection, may be a direct connection or an indirect connection via a medium, and may be an internal connection between two components. Those skilled in the art should understand the specific meanings of the above terms in the present invention based on specific situations.

The terms "include", "comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

The technical solutions of the present invention are described with reference to the preferred implementations and accompanying drawings. Those skilled in the art should easily understand that the protection scope of the present invention is apparently not limited to these specific implementations. Those skilled in the art may make equivalent changes or substitutions to the relevant technical features without departing from the principles of the present invention, and the technical solutions derived by making these changes or substitutions should fall within the protection scope of the present invention.

What is claimed is:

1. A triaxial rock mechanics test system for a high-strain-rate cyclic dynamic loading, comprising: a host loading module, a dynamic cyclic loading module, and a dynamic measurement module; wherein the host loading module comprises a loading frame, a triaxial pressure mechanism and an actuator, and the triaxial pressure mechanism and the actuator are provided inside the loading frame; the actuator is provided under the triaxial pressure mechanism; the triaxial pressure mechanism is configured to apply a first axial pressure and a confining pressure to a rock sample placed in the triaxial pressure mechanism; the loading frame is allowed to cooperate with the actuator to apply a second axial pressure to the triaxial pressure mechanism;

the dynamic cyclic loading module comprises a driving mechanism, a fixed mechanism and a mobile mechanism; the driving mechanism and the fixed mechanism are fixedly provided under the actuator; a plurality of shock wave excitation devices are arranged in sequence inside the mobile mechanism; an energetic rod is provided inside each shock wave excitation device of the plurality of shock wave excitation devices; the mobile mechanism is allowed to reciprocate relative to the fixed mechanism under a drive of the driving mechanism;

in a working state, the driving mechanism drives the mobile mechanism to reciprocate relative to the fixed mechanism, a first action portion of the each shock wave excitation device sequentially contacts with a second action portion of the fixed mechanism to excite the energetic rod to generate a controllable shock wave; the controllable shock wave applies a force to the actuator to realize the high-strain-rate cyclic dynamic loading of the rock sample;

the dynamic measurement module is configured to acquire axial pressure data, radial deformation data and axial deformation data of the rock sample during a test.

2. The triaxial rock mechanics test system for the high-strain-rate cyclic dynamic loading according to claim 1, wherein an oil cylinder is sleeved outside the actuator; the oil cylinder is configured to drive the actuator to move upwards in a vertical direction before the dynamic cyclic loading module works, so as to drive a piston of the triaxial pressure mechanism to be in a close fit with the loading frame to provide a pre-tightening force for the triaxial pressure mechanism.

3. The triaxial rock mechanics test system for the high-strain-rate cyclic dynamic loading according to claim 2, wherein the loading frame comprises a door-shaped frame; an upper beam of the loading frame is provided with an upper load pressure sensor, the upper load pressure sensor is coaxial with the triaxial pressure mechanism and provided at a position adjacent to the triaxial pressure mechanism.

4. The triaxial rock mechanics test system for the high-strain-rate cyclic dynamic loading according to claim 1, wherein the host loading module comprises a hydraulic oil source and a servo controller; the hydraulic oil source is connected to the triaxial pressure mechanism; the servo controller is communicatively connected to the hydraulic oil source; the hydraulic oil source is configured to store hydraulic oil; the servo controller is allowed to feed the hydraulic oil into the triaxial pressure mechanism by controlling the hydraulic oil source to provide the confining pressure for the rock sample, and the servo controller is allowed to pressurize the triaxial pressure mechanism to make the hydraulic oil return to the hydraulic oil source after the test.

5. The triaxial rock mechanics test system for the high-strain-rate cyclic dynamic loading according to claim 1, wherein the triaxial pressure mechanism comprises a piston; the piston has an extension end extending outside the triaxial pressure mechanism; a pressure pad and a pressure head are further provided inside the triaxial pressure mechanism; the piston, the pressure head and the pressure pad are sequentially arranged in a vertical direction directly above the rock sample; an end surface of the pressure head away from the pressure pad is a spherical convex surface.

6. The triaxial rock mechanics test system for the high-strain-rate cyclic dynamic loading according to claim 1, wherein the host loading module further comprises a sliding block and a sliding rail, and the sliding block and the sliding rail match each other; the sliding rail is provided above the actuator; the sliding block is configured to carry the triaxial pressure mechanism; the sliding block is allowed to drive the triaxial pressure mechanism to move, along an extension direction of the sliding rail, to a position directly above the actuator.

7. The triaxial rock mechanics test system for the high-strain-rate cyclic dynamic loading according to claim 1, wherein the driving mechanism comprises a drive motor and a first gear; the first gear is connected to an output shaft of the drive motor, and the first gear is allowed to rotate around an axis of the first gear under a drive of the drive motor;

the mobile mechanism comprises a bearing structure; the bearing structure is configured to bear the plurality of shock wave excitation devices arranged in sequence; the bearing structure is provided with a meshing portion meshing with the first gear; the each shock wave excitation device has the first action portion extending outside the bearing structure;

a first action groove and a second action groove are provided inside the fixed mechanism; the first action groove is vertically provided in a center of the fixed mechanism; the second action groove is provided below the first action groove and matches a shape of the mobile mechanism; the first action groove and the second action groove penetrate each other; the actuator is vertically movably provided in the first action groove; the mobile mechanism is movably provided in the second action groove; an inner wall of the second action groove is provided with a brush;

in the working state, the driving mechanism drives the first gear to rotate around the axis of the first gear, the bearing structure is driven to move relative to the fixed mechanism, and the first action portion of the each shock wave excitation device is in a sliding contact with the brush in sequence.

8. The triaxial rock mechanics test system for the high-strain-rate cyclic dynamic loading according to claim 7, wherein the bearing structure is an arc-shaped structure, and the second action groove is an arc-shaped action groove; the brush is provided in a close contact with the inner wall of the second action groove; the bearing structure and the second action groove are arranged concentrically.

9. The triaxial rock mechanics test system for the high-strain-rate cyclic dynamic loading according to claim 7, wherein the energetic rod comprises a metal wire; the metal wire is covered with an energetic material layer; the each shock wave excitation device is configured to drive the metal wire to electrically explode, and a chemical bond of an energetic material in the energetic material layer breaks and a chemical energy is released to generate the controllable shock wave.

10. The triaxial rock mechanics test system for the high-strain-rate cyclic dynamic loading according to claim 1, wherein the dynamic measurement module is provided inside the triaxial pressure mechanism and comprises a laser deformation sensor, an interferometric fiber optic displacement sensor and a piezoresistive pressure sensor.

\* \* \* \* \*